US007118479B2

(12) United States Patent
D'Amico et al.

(10) Patent No.: US 7,118,479 B2
(45) Date of Patent: Oct. 10, 2006

(54) GAMING AWARD TECHNIQUES

(75) Inventors: Michael H. D'Amico, Las Vegas, NV (US); Tara L. Young, Las Vegas, NV (US); Stephanie Maddocks, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 203 days.

(21) Appl. No.: 10/460,516

(22) Filed: Jun. 12, 2003

(65) Prior Publication Data

US 2004/0254009 A1 Dec. 16, 2004

(51) Int. Cl.
*A63F 13/00* (2006.01)

(52) U.S. Cl. .......................................................... 463/25

(58) Field of Classification Search .................. 463/25, 463/30–31, 43

See application file for complete search history.

(56) References Cited

U.S. PATENT DOCUMENTS 4,918,603 A 4/1990 Hughes et al.
5,761,647 A 6/1998 Boushy
6,375,567 B1 4/2002 Acres
6,857,959 B1 * 2/2005 Nguyen ........................ 463/25
2002/0142825 A1 * 10/2002 Lark et al. ..................... 463/16
2003/0083943 A1 5/2003 Adams et al.

FOREIGN PATENT DOCUMENTS

AU B-70382/94 8/1994

OTHER PUBLICATIONS

PCT, International Search Report, Jun. 20, 2005.
International Searching Authority, Written Opinion, Jun. 20, 2005.

* cited by examiner

*Primary Examiner*—Kim Nguyen
(74) *Attorney, Agent, or Firm*—McAndrews, Held & Malloy

(57) ABSTRACT

A gaming system (100) includes a gaming location (102) that comprises an interactive communication unit (119), including a display 118 visible from the gaming location that displays a representation of award-types that a player can select. One of the awards selected may be a bonus game playable on display 118.

20 Claims, 2 Drawing Sheets

GAMING AWARD TECHNIQUES

BACKGROUND OF THE INVENTION

This invention relates to gaming systems, and more particularly relates to awards for the players of such systems.

Gaming machines offer various awards for play, including a cash award, a point award convertible to cash, a complementary award convertible to goods or services (e.g., food or lodging), but not to cash, and an award of a bonus game. U.S. Pat. No. 5,761,647 (Boushy, issued Jun. 2, 1998) describes the award of points and complementaries. U.S. Pat. No. 6,375,567 describes an award of a bonus or secondary game.

However, none of the foregoing patents enables a player to select the type of award desired by the player. This deficiency may decrease the level of interest in play due to the player's inability to pursue a desired form of award. This invention addresses the problems presented by the foregoing patents and provides a solution.

BRIEF SUMMARY OF THE INVENTION

One apparatus form of the invention is useful in a gaming system comprising a gaming machine arranged to enable play of at least a first game by a player. In such an environment, apparatus for enabling the player to select a type of award comprises a display and a memory arranged to store signals identifying a plurality of award types. A processor is arranged to display on the display a representation of the types of awards available for selection by the player.

Also, an account for the player may be stored in memory. The processor may store an award type in relation to the account for the player in response to a selection of the award type by the player.

One method form of the invention is useful in a gaming system comprising a gaming machine arranged to enable play of at least a first game by a player. In such an environment, a player is enabled to select a type of award by a method comprising storing signals identifying a plurality of award types. A representation of the types of awards available for selection is displayed and the player is enabled to select one of the award types.

Also, an account for the player may be stored in memory. The selected award type may be stored in relationship to the account for the player.

By using techniques of the foregoing type, gaming awards may be used to motivate a player with a degree of convenience and accuracy previously unavailable.

DETAILED DESCRIPTION OF THE INVENTION

Figure 1:
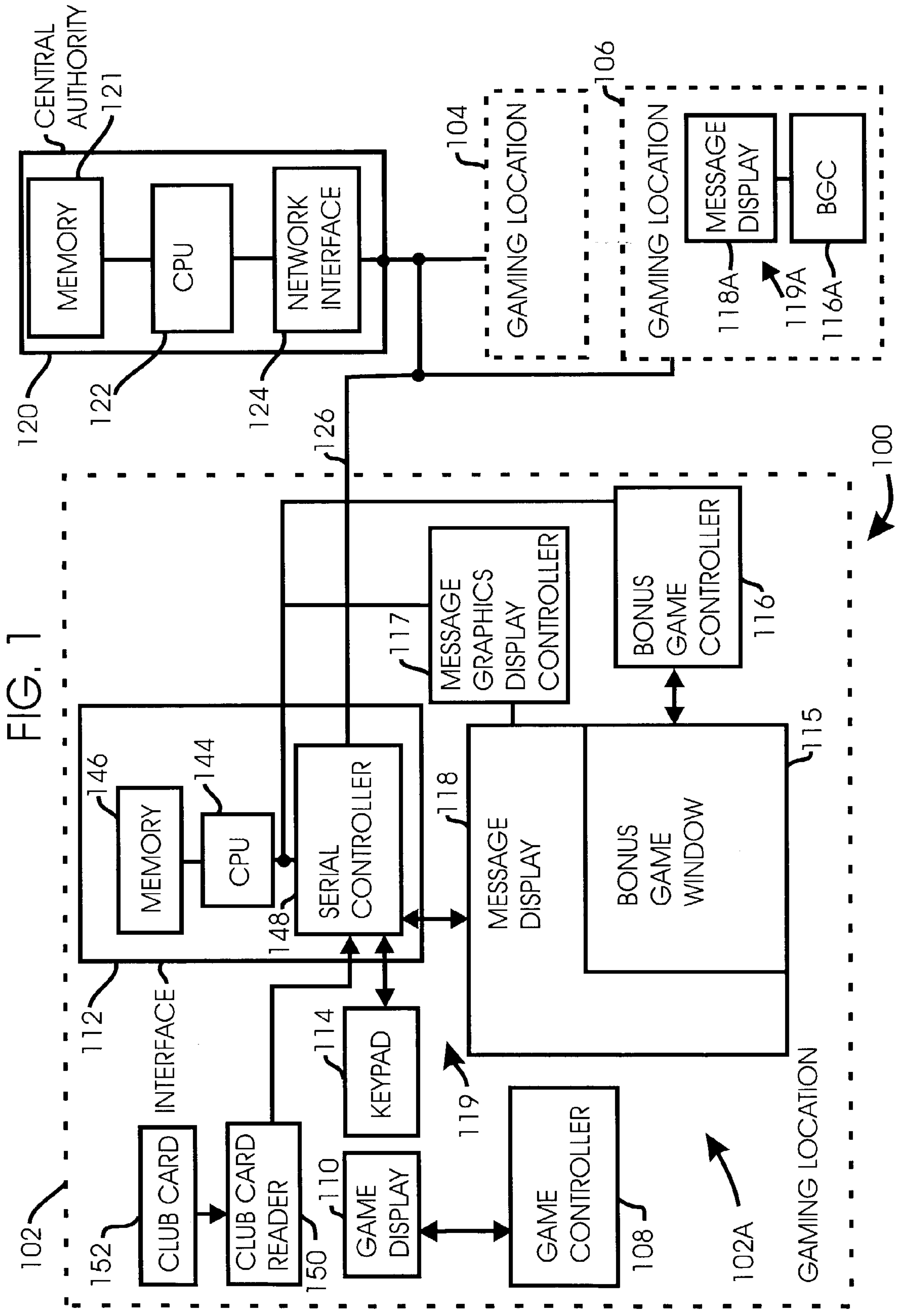
FIG. 1 is a schematic block diagram of one form of gaming system employing a game display enabling play of a game and a message display enabling display of a representation of the types of awards available for selection by a player.

Referring to FIG. 1, gaming system 100 includes several gaming locations 102, 104 and 106 that may include various non-machine games, such as craps and blackjack, or may include gaming machines, such as slot machines, video poker machines, video roulette machines, and the like.

Gaming location 102 is exemplary of gaming locations 104 and 106. If gaming location 102 includes a gaming machine 102A, a game controller 108 and a game display 110 are provided. For both a non-machine gaming location and a gaming machine location, a location interface 112, an optional alphanumeric keypad 114 and a touch screen message display 118 are provided. Display 118 may comprise a touch screen liquid crystal display (LCD) similar to the displays used in laptop computers. A similar message display 118A is provided at gaming location 106. Display 118 is coupled to or located inside the cabinet of gaming machine 102A, and may, for example, take the form of a rectangle about 3 inches high and 4 inches wide. Using an LCD inside a gaming machine in order to display graphics images and to display a numeric or alphabetic input image is advantageous because it eliminates the need for a separate keypad for the interactive entry of data. In addition, an LCD requires less space than many other types of displays. These considerations are important, because there usually is very limited space inside or adjacent a gaming machine. An optional alphanumeric keypad 114 may be placed for convenient manipulation while a player is using gaming location 102.

A conventional graphics display controller 117 controls display 118. Controller 117 can display either vector graphics or bit-mapped graphics on display 118, depending on the type of application program stored in a memory 146 used for graphic display and the type of data stored for purposes of generating graphics images. The image data resulting in graphics images can be stored in memory 146 of the interface 112. Alternatively, the image data can be stored in a memory 121 of a central authority 120 and transmitted via a network 126 to controller 117 for a particular graphic image. The image data can be either vector data or bit-mapped data. A central processing unit (CPU) 144 of the interface 112 controls the transfer of the image data to controller 117 in response to application programs stored in memory 146 that determine the location of the graphics images on display 118 and also determine the time at which the graphics displays are presented.

Interface 112, optional keypad 114, controller 117 and display 118 comprise an interactive communication unit 119. Each of the gaming locations 104 and 106 include an interactive communication unit like unit 119. For example, gaming location 106 includes a communication unit 119A like unit 119. In one embodiment, a player enters alphabetic and numeric information by touching display 118. In such an embodiment, keypad 114 may not be provided. For the non-machine gaming locations, interface 112 comprises a communication controller 148, such as a modem.

In this specification, interactive means capable of accepting input from a human. Communication unit 119 comprises one or more programs for accepting such input from, for example, a touch screen alphanumeric image. Such programs are well known to those skilled in computer communication.

For a gaming machine location, interface 112 may include, for example, an RS485 interface such as that implemented by a Sentinel™ Interface from Aristocrat Technologies, Inc. Other interfaces and network architectures (e.g., Ethernet, parallel port, and the like) may be substituted however. Furthermore, interface 112 may implement, for example, the IGT Gaming SAS™ communication protocol or the CDS GDAP™ communication protocol for communication with gaming machine 102A, or a custom communication protocol. In gaming machine 102A, message display 118 may be coupled to the frame of the gaming machine or may be inside the cabinet of the gaming machine. However, any means of associating display 118 with gaming machine 102A may be used as long as display 118 is visible from gaming machine 102A.

Interface 112 is programmed to provide an interactive data entry operation. That is, user message activity, such as touching an active area of display 118 or entering information from keypad 114, causes a response from or action by system 100. One such response is storage of data selected by a player in memory 146 of the interface 112 or in memory 121 of the central authority 120.

User preferences of award types may be stored in interface memory 146 that is controlled by CPU 144. CPU 144 controls the sending of data by gaming location 102 to the central authority, the receipt of messages by gaming location 102 from the central authority, and the display of messages by gaming location 102 in a well-known manner. Thus, CPU 144 may send data as to user preferences of award types to the central authority for storage in memory 122.

Game controller 108 is responsible for operation of the gaming machine 102A. Thus the game controller may include a microprocessor, memory, game software, and support circuitry to implement a slot machine or other type of game. The display 110 provides displays which are necessary for the play of the game, such as a display of slot machine rotors. Game display 110 and message display 118 may be combined into a single display device, if desired.

Gaming location 102 also includes a club card reader 150 that can read a MAG number located on a magnetic strip of a club card 152, which may, for example, be a smart card. The MAG number is unique for each player. Card 152 also sometimes bears a player ID number that is human readable, but is not machine-readable. The card reader sends the MAG number to central authority 120, which converts the MAG number to an OCR number. This feature prevents any potential misuse due to fraudulent creation of a bogus club card. Memory 121 maintains a table that correlates OCR numbers with player ID numbers.

Central authority 120 translates an OCR number to a corresponding player ID number. This feature allows a single player ID number to identify more than one OCR number. The player ID number can be used by the central authority to address the value of an account corresponding to the player ID number or to access preferences, such as award type, of the player. Thus, the central authority keeps no account value or preferences corresponding to the MAG number or OCR number; it only keeps an account value and preferences corresponding to the player ID number, correlated with the OCR number by a table.

Central authority 120 includes a central processing unit (CPU) 122 that operates through a network interface 124 and a network 126 to enable communication of data with gaming locations 102, 104 and 106. Network 126 may be a conventional local area network, which allows data to be sent directly between any of gaming locations 102, 104 and 106, and central authority 120. Memory 121 also may store data for the award type display shown in FIG. 2. Alternatively, the data for the award types may be stored locally in the memories for each of the gaming locations, such as memory 146.

Figure 2:
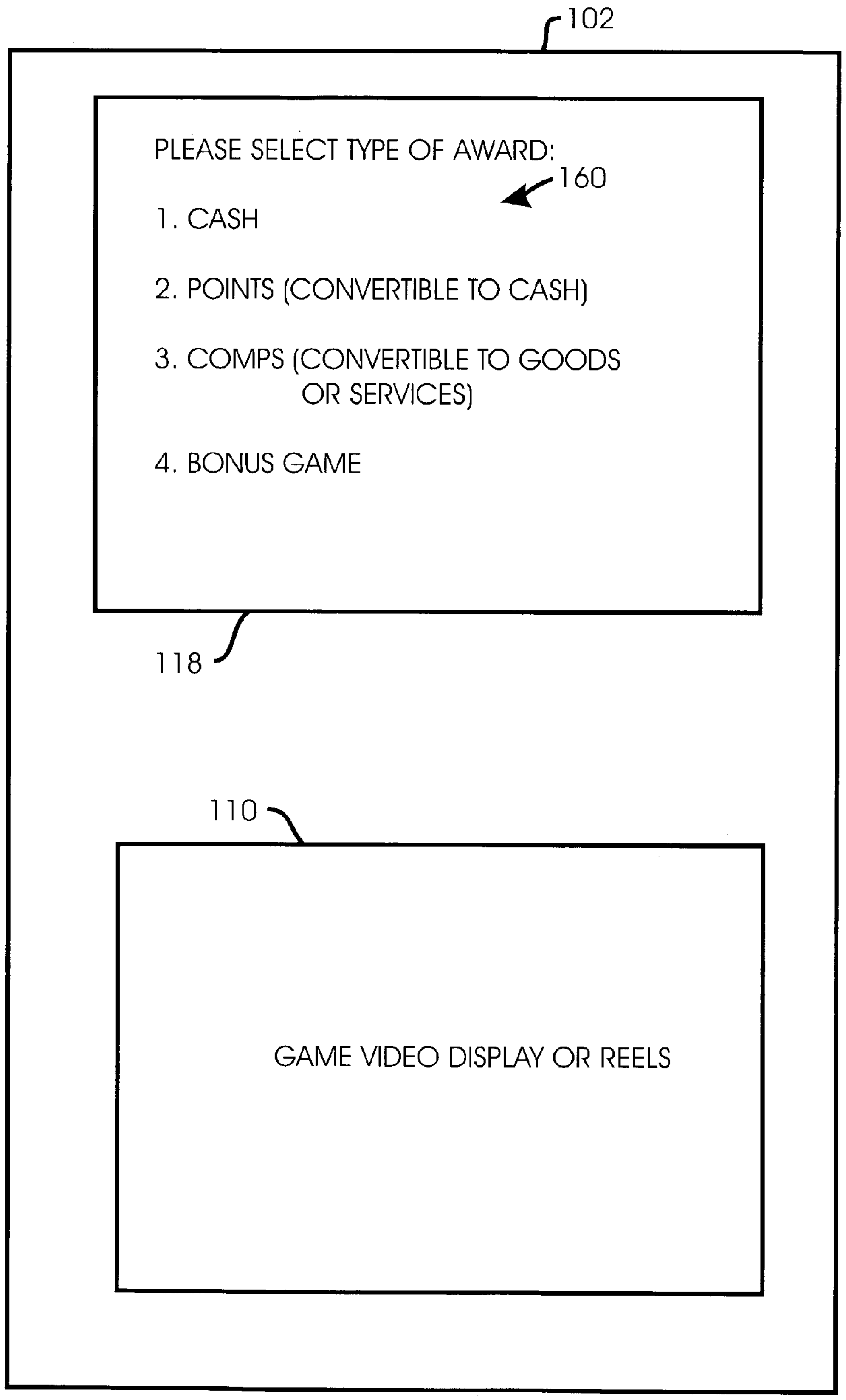
FIG. 2 is a block diagram of one of the gaming location message displays shown in FIG. 1, together with a game video display.

FIG. 2 illustrates message display 118 in relationship to game display 110. Display 118 illustrates an exemplary display 160 representing the types of awards available for selection by a player. As will suggest itself, display 118 may be implemented as a window within display 110, for example.

Four award types are shown in FIG. 2, although additional award types may be displayed for selection by the player. The selection of an award type by the player dictates how awards will be processed by the system. In certain regulated jurisdictions, players are not permitted to change the award type. In those jurisdictions, the machines payout only cash, for example. However, bonus awards may be unregulated, and thus, the player may be allowed to select the type of bonus award. Thus, in certain regulated jurisdictions, embodiments of the invention may be limited to bonus awards only and may not be used for regulated gaming machine payouts.

Referring again to FIG. 2, award type 1 is cash. For example, when the player wins or is granted an award during play of a game on machine 102A, cash may be dispensed by the game in the form of coins. Typically, however, the cash won will be put on the credit meter in the form of credits. The player may then press the cashout button on the gaming machine to obtain cash, or merely play out all or some of the credits.

Award 2 is points which are convertible to cash. For example, if a player wins a game or is awarded a bonus on machine 102A, the value of the win or bonus is transferred to the player's account in memory 121 in the form of points, which may be redeemable for cash (or for play) at a later time.

Award 3 is complementaries (comps) that are not convertible to cash, but are convertible to other awards, such as goods (e.g., meals) or services (e.g., hotel accommodations). For example, if a player wins a game or is awarded a bonus on machine 102A, the value of the win or award may be transferred to the player's account in memory 121 in the form of comps, that is, in the form of comp dollars. Such comp dollars may be used to purchase goods or services.

Award 4 is a bonus game. For example, if a player wins a game or is awarded a bonus on machine 102A, the win or bonus award may be the activation of a secondary bonus game.

As will be appreciated from the above discussion, "cash" is an award type; whereas "$5.00" is an award and not an award type. "Points" is an award type; whereas, "50 points" is an award and not an award type. "Credits" is an award type; whereas, "5 credits" is an award. "Comps" or "comp dollars" is an award type; whereas "$5.00 comp value" is an award. "Bonus game" is an award type. "Secondary game" is an award type. Even where the game indication is specific as to the type of game, it is still an award type. For example, "roulette game" or "dice game" or "card game" or "blackjack" is an award type.

As shown in FIG. 1, images required for play of the bonus game are displayed in a bonus game window 115 of message display 118. The bonus game is controlled by a conventional bonus game controller 116 that receives signals from CPU 144 as shown. A similar bonus game controller 116A is provided at gaming location 106. Bonus game controller 116 need not be a separate piece of hardware or software, but may comprise software in interface 112 which is executed by CPU 144. Bonus game controller 116 may be software and/or hardware located anywhere in the system, which generates the bonus game in window 115.

The bonus game is an award for a single gaming machine played by a single player, and not an award triggered by a group of gaming machines played by a plurality of players. Play of the bonus game itself could result in an award, either fixed in type (e.g., cash) or selectable as to type by the player via a display 160. Further, play of the bonus game could result in another second bonus game, different than the first bonus game. Such subsequent bonus games may increase in level of difficulty (based on odds, for example) with the player given the opportunity (by a display 160 following each game) to select an award which has incremented in value to a level depending on the difficulty of the last bonus game played or to select a more difficult bonus game than the last bonus game played.

For example, the bonus game may include the display of a plurality of images in window 115. The player selects one of the displayed images by touching the image on the display. This touch action by the player reveals a bonus award beneath the touched image, which is granted to the player. The bonus award under the touched image may be $50, for example. A bonus award under another image which was not touched may be 500 points, for example. The bonus award under a third untouched image may be a buffet dinner. Other bonus games may be used as will suggest themselves to persons skilled in the art. It is to be appreciated that award preferences earlier selected by the player could control the bonus game presented. For example, where the player prefers credits, a bonus game that awards only credits would be used with that player.

Signals identifying the award types shown in FIG. 2 may be stored in memory 146 or memory 121. Memory 121 also may store an account for the player that is correlated with the ID number of the player associated with club card 152. Alternatively, the account for the player may be correlated to the player at the gaming machine in a way other than the Club Card, as for example, by the player typing a password on the keypad, or responding at the keypad to visual display prompts, or by a finger print reader or other biometric entry device.

Either CPU 144 or CPU 122 causes the available award type data stored in memory 146 or memory 121 to result in the display shown in FIG. 2 on message display 118. As shown in FIG. 2, the player is encouraged to select one of the four types of awards listed on the display. Selection can be performed by touching the image of the desired award type on screen 118, or by entering the number corresponding to the desired award type on keypad 114, followed by depression of an "ENTER" button on the keypad.

The selected award type is then used immediately (if there is an award pending) to issue the award in the selected form. Thus, display 160 may be presented each time an award is won.

Alternatively, display 160 may be used to obtain the player's preference before the award is won. The selected award is stored in memory 146 or may be stored in memory 121 in relationship to the player account for the player. For example, the selected award type may be indexed or correlated with the ID number of the player. Alternatively, the selected award type may be stored in the account for the player.

Thus, after a player has been identified at a gaming machine due to use of a player card or otherwise, CPU 122 downloads the player's preference as to award types from memory 121 to memory 146. CPU 144 then controls the awards in accordance with the downloaded preference.

For example, a bonus award having a value of $5.00 may be granted each time the game reels display 2, 4, 6, 8 and 10. When the bonus award is won, CPU 144 will make payment according to the appropriate award type based on the player's preference of award type that was downloaded when the player was earlier identified. That is, the bonus award having a $5.00 value will be either (1) cash in the form of 5 credits put on the credit meter, assuming this to be a $1.00 denomination game, (2) 50 points added to the player's account, (3) $5.00 of comp value added to the player's account, or (4) the play of a bonus game.

If there are no preferences available to CPU 144 because the player does not have an account, for example, or that the player has not stored preferences in association with his or her account, or otherwise, CPU 144 may generate display 160. The player then responds to display 160 to receive the award in the type selected.

Alternatively, the casino may establish specific awards on the screen 160. For example, number 1 on display 160 may be set to read "5 credits" , number 2 may be set to read "50 points" , number 3 may be set to read "$10.00 comp" or "Free Buffet Dinner". This allows the casino to customize the display 160. Further, a different display 160 may be used for a different bonus award. If the reel combination is 2, 4, 6, 8, 10, then one display 160 with preprogrammed settings is displayed to the player; if the reel combination is 2, 2, 2, 2, 6, then another display 160 with different preprogrammed settings is displayed to the player. The casino may cause individual gaming machines to store signals for a display 160 in memory 146, or the casino may cause the signals for display(s) 160 to be stored in memory 121.

A player may change his stored preference at the gaming machine through interaction with the display 118 and/or keypad 114. The change in preference may then be uploaded to memory 121.

Still further, in the event that a player does not have an account, the selected award type (for example, cash or bonus game) may be stored at the gaming machine in memory 146. This selected award type then controls the following play on that gaming machine. For example, the machine 102A could generate display 160 as each new player begins play. This could occur from a fixed time after the credit meter reaches zero, to indicate that a new player has begun to play. This allows a player to select cash or bonus game awards to be the set criteria, without the need for the player to have a player account. The set criteria could be stored in memory 146.

The award selection screen shown in FIG. 2 may be presented before a game is played on gaming machine 102A, during the play of such a game, or after completion of play of the game on machine 102A (or after a bonus award has been won). The time of the display of the display 160 is controlled by CPU 144 or CPU 122 in a well-known manner.

The display 160 of the award selection screen shown in FIG. 2 may result from play of a first game on machine 102A. For example, the display may be triggered by winning of a game played on machine 102A or by occurrence of a random event during play of the game on machine 102A. Alternatively, the display 160 shown in FIG. 2 may be triggered by a random event at a time when no game is being played on machine 102A. For example, as soon as the player logs onto machine 102A by inserting his club card, the CPU 122 may note that the player is having a birthday, and may initiate the display shown in FIG. 2 as a reward.

As understood, points or comp awards, as well as award preferences, may be stored in memory 146 during play by the player of gaming machine 102A and then uploaded to memory 121 every hour or at the time of removal of the player card 152 from card reader 150.

Those skilled in the gaming and computer arts are able to program the interfaces and central authority to provide the displays and interactivity described in the accompanying drawings and described in this specification.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. In a gaming system comprising a gaming location for providing play of at least a first game by a player, and having a display device, a method of enabling the player to select one of a plurality of different award types, comprising:

establishing winning odds for a predetermined winning outcome;

displaying to the player on said display device a representation of a plurality of different award types available for selection for said winning outcome;

after said step of establishing winning odds, selecting by the player one of said award types for said winning outcome;

playing the first game;

determining the outcome of the first game according to the winning odds, wherein said winning odds are not dependent on said award types available for selection; and paying to the player an award in accordance with said one of said award types selected by the player.

2. The method according to claim 1 wherein said award types include cash, points and comp value.

3. The method according to claim 1 wherein said award types include play of a second game by the player.

4. The method according to claim 3 wherein said second game is a different game than said first game.

5. The method of claim 1, wherein the steps of displaying and selecting occur before play of the first game.

6. The method of claim 1, wherein the step of selecting occurs during play of the first game.

7. The method of claim 1, wherein the step of selecting occurs after play of the first game.

8. The method of claim 1, wherein the award results from play of the first game.

9. The method of claim 1, wherein the award results from a random event.

10. In a gaming system comprising a gaming machine arranged to enable play of at least a first game by a player, a method of enabling the player to select an award type comprising:

establishing winning odds for a predetermined winning outcome;

storing signals identifying a plurality of award types;

storing an account for the player;

displaying a representation of the award types available for selection for said winning outcome;

after said step of establishing the winning odds, enabling the player to select one of the award types for said winning outcome; and storing the selected award type in relationship to the account for the player, wherein the winning odds for said winning outcome are not dependent on the award types available for selection.

11. The method of claim 10 wherein the enabling comprises enabling the player to select one of the award types by touching the representation of one of the award types.

12. The method of claim 10 wherein the enabling comprises enabling the player to select one of the award types by keyboard manipulation.

13. The method of claim 10 wherein the award types comprise at least one of a first award type of cash, a second award type of goods or services and a third award type of play of a second game by the player.

14. The method of claim 10 wherein an award results from play of the first game.

15. The method of claim 10 wherein an award results from a random event.

16. The method of claim 10 wherein the enabling occurs before play of the first game.

17. The method of claim 10 wherein the enabling occurs during play of the first game.

18. The method of claim 10 wherein the enabling occurs after play of the first game.

19. The method of claim 10 and further comprising displaying images enabling play of the first game separately from the displaying of the representation of the award types.

20. The method of claim 19 wherein the system comprises a message display, wherein the displaying of the representation of the award types occurs on the message display and further comprising displaying images enabling play of the second game on the message display.

* * * * *